(12) United States Patent
Obermeyer

(10) Patent No.: US 6,196,763 B1
(45) Date of Patent: Mar. 6, 2001

(54) CONNECTION SYSTEM FOR HOSES, EXPANSION JOINTS AND ACTUATORS

(76) Inventor: Henry K. Obermeyer, 303 W. County Rd., Wellington, CO (US) 80549

( * ) Notice: Subject to any disclaimer, the term of this patent is extended or adjusted under 35 U.S.C. 154(b) by 0 days.

(21) Appl. No.: 09/008,014

(22) Filed: Jan. 16, 1998

Related U.S. Application Data

(63) Continuation-in-part of application No. 08/518,620, filed on Aug. 23, 1995, now Pat. No. 5,709,502.

(51) Int. Cl.⁷ .................. F16D 1/00; F16L 23/00
(52) U.S. Cl. .......... 405/91; 405/114; 405/115; 403/337; 285/222.1; 285/222.3; 285/368; 464/92; 464/182
(58) Field of Search .................. 405/80, 87, 91, 405/107, 114, 115; 403/337; 285/222.1–222.5, 368, 414; 464/87, 92, 182, 183

(56) References Cited

U.S. PATENT DOCUMENTS

| | | | | |
|---|---|---|---|---|
| 294,160 | * | 2/1884 | Sweeney | 285/412 |
| 1,185,487 | * | 5/1916 | Eastman | 285/119 |
| 1,939,872 | * | 12/1933 | Bedur | 285/368 |
| 2,201,684 | * | 5/1940 | Kingsbury | 432/264 |
| 2,408,960 | * | 10/1946 | Stivason | 285/412 |
| 2,911,236 | * | 11/1959 | Thibault | 285/222.4 |
| 2,919,936 | * | 1/1960 | Hurley | 285/55 |
| 3,235,291 | * | 2/1966 | Jacoby | 285/55 |
| 3,563,573 | * | 2/1971 | Crompton et al. | 285/55 |
| 4,023,782 | * | 5/1977 | Eifer | 266/186 |
| 4,484,771 | * | 11/1984 | Schulz | 285/368 |
| 4,537,003 | * | 8/1985 | Huber et al. | 52/396.05 |
| 4,649,960 | * | 3/1987 | Policelli | 464/182 X |
| 4,747,806 | * | 5/1988 | Krude et al. | 464/182 |
| 4,774,795 | * | 10/1988 | Braun | 52/396.07 |
| 4,838,831 | * | 6/1989 | Rumberger | 464/182 X |
| 4,872,712 | * | 10/1989 | Maier | 285/414 X |
| 5,716,158 | * | 2/1998 | Hahn et al. | 403/291 |

* cited by examiner

Primary Examiner—Eileen D. Lillis
Assistant Examiner—Tara L. Mayo
(74) Attorney, Agent, or Firm—Dean P. Edmundson

(57) ABSTRACT

Tubular structures are described which are composed of multiple layers of reinforced material. The structures include at least one terminal end portion which includes one or more wedges between adjacent layers of reinforced material. The structures may be, for example, hoses, expansion joints, or actuators (e.g., air springs). The terminal end portions can be readily clamped together to make appropriate connections, or a terminal end portion can be clamped to a desired mounting surface.

9 Claims, 18 Drawing Sheets

CONNECTION SYSTEM FOR HOSES, EXPANSION JOINTS AND ACTUATORS

CROSS-REFERENCE TO RELATED APPLICATION

This application is a continuation-in-part of my application Ser. No. 08/518,620, filed Aug. 23, 1995, now U.S. Pat. No. 5,709,502.

FIELD OF THE INVENTION

This invention generally relates to systems for connecting reinforced hoses and similar reinforced elastomeric cylindrical structures to each other or to corresponding support structures or rigid pipe elements.

BACKGROUND OF THE INVENTION

Hose terminations for large diameter hose (e.g. over 8 inches in diameter) commonly use large heavy metal spools with attached flanges to terminate each end of a hose. Such spool assemblies are typically vulcanized into an enlarged portion of each end of the resective hose. Abrasion or corrosion protection of such metal spools may require a separate rubber lining for the spool piece. Such assemblies are heavy, inflexible, and costly. Conventional rubber flanges overcome the weight, flexibility and cost problems associated with the metal spools but are limited as to service life and maximum operating pressure. This is because such rubber flanges rely directly on the clamping bolts and on flange friction to resist pull-out. Although a rigid ring may be incorporated near the outer diameter of such a design, the resulting shear loads in the elastomer and the tensile loads in the reinforcement are non-uniform, thus limiting the ultimate strength of the conventional design. Additionally, the conventional arrangement with a flat flange may require periodic re-tightening of the clamping bolts in order to maintain a tight seal.

SUMMARY OF THE PRESENT INVENTION

In accordance with the present invention there is provided an enlarged section at the hose end comprised of multiple plies or layers of reinforcement separated by preferably elastomeric wedges integrally vulcanized thereto. In other words, the hose comprises a plurality of layers of reinforced material, and the terminal end of the hose includes wedge means between adjacent layers of the reinforced material. Each such wedge may be rigid or elastomeric, and preferable each wedge has a triangular cross-section. Opposite side surfaces of each wedge are bonded to the adjacent layers of the reinforced material.

A further advantage of this connection system is that it does not rely on friction or chemical bonding to the clamp components to retain the hose within the connection. The present invention, in fact, functions very well even if all components are lubricated prior to assembly. The connection system of the present invention is thus immune to time-dependent slippage of friction surfaces.

BRIEF DESCRIPTION OF THE DRAWINGS

The invention is described in more detail hereinafter with reference to the accompanying drawings, wherein like reference characters refer to the same parts throughout the several views in which.

DETAILED DESCRIPTION OF THE INVENTION

Hose connections which include the unique connection system of this invention are composed preferably of multiple layers of reinforced elastomeric material (e.g. natural or synthetic rubber). A preferred reinforcement connection system is shown in my copending application Ser. No. 08/518,620, filed Aug. 23, 1995, incorporated herein by reference.

Figure 6:
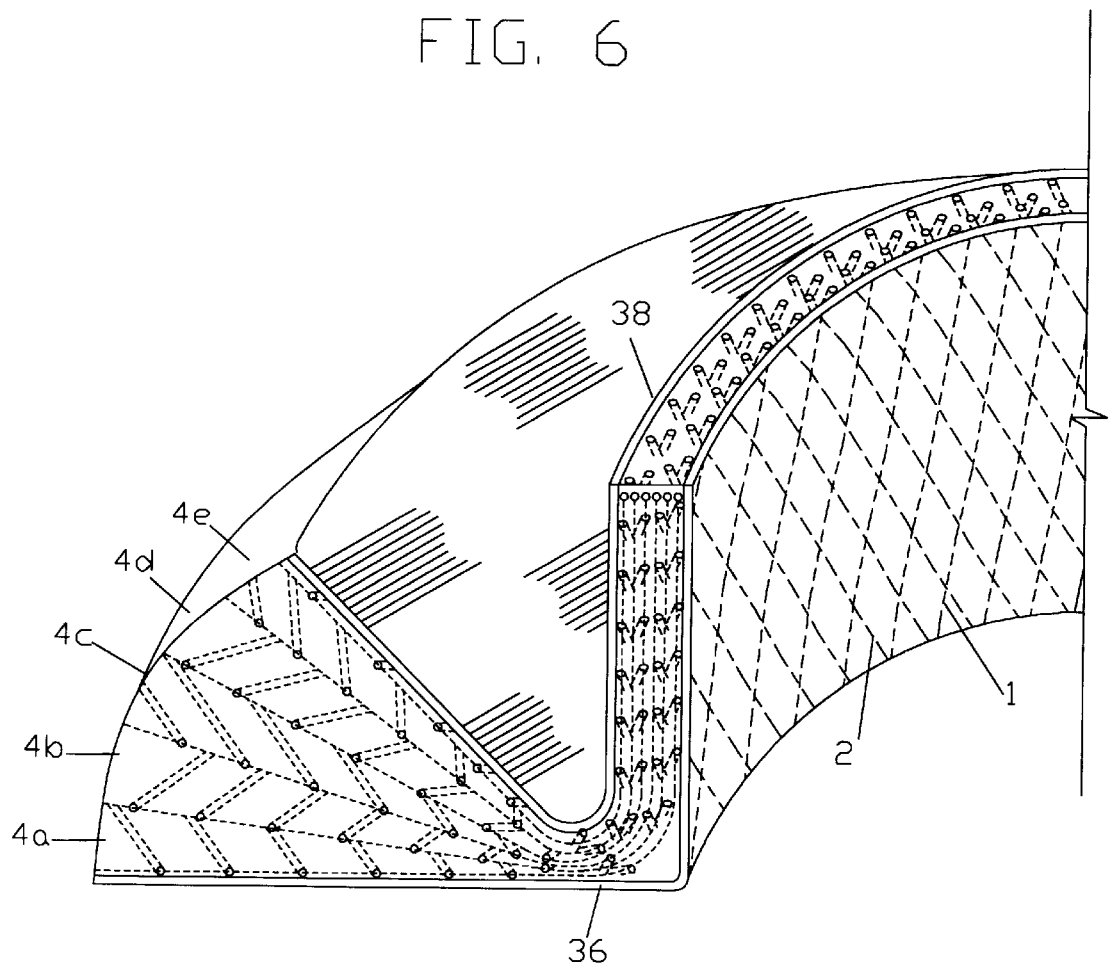
FIG. 6 is a cut-away detailed view of the hose reinforcement associated with one embodiment of the present invention.
Figure 17:
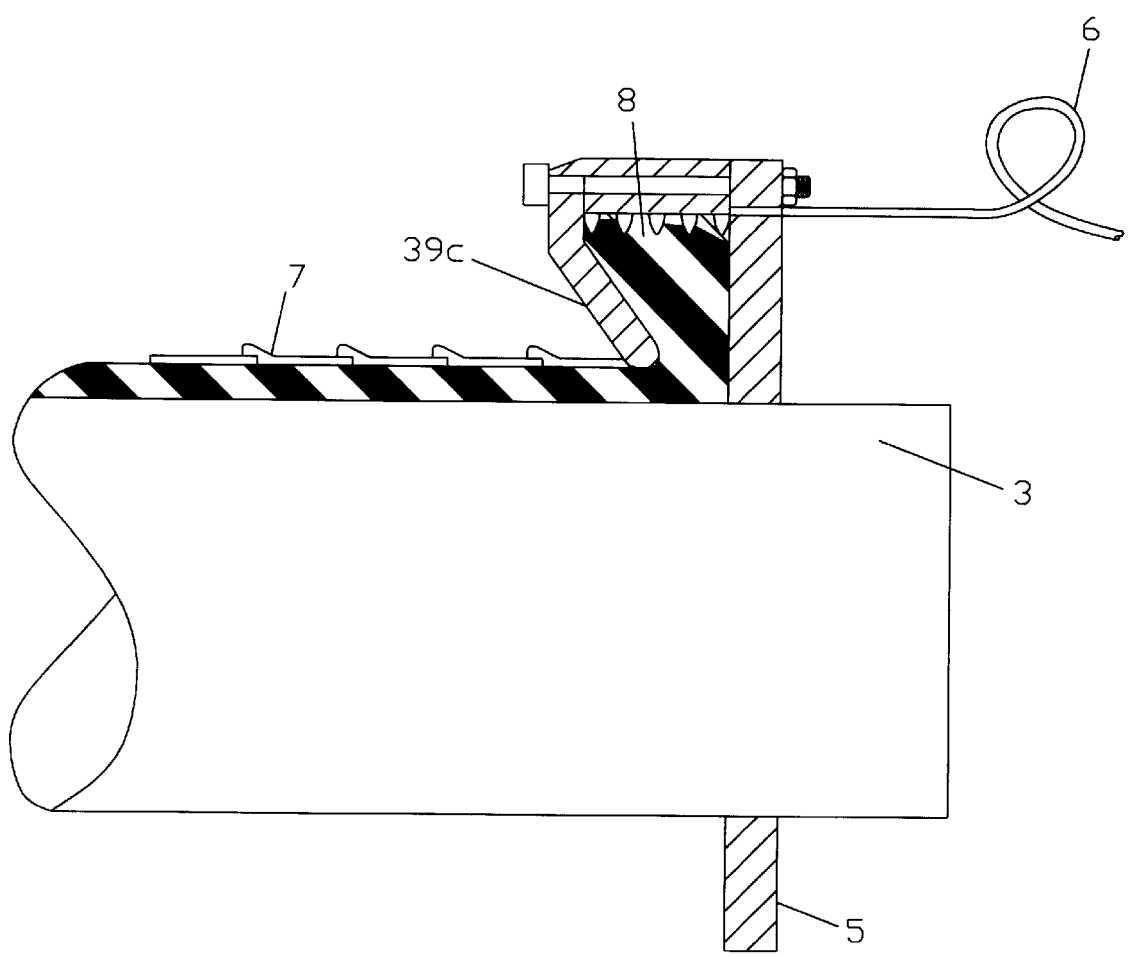
FIG. 17 is an embodiment of the present invention as it may be configured during the manufacturing process.

Hoses with wedge section terminations can be manufactured by laying up in sequence, referring to FIG. 6, an inner liner 36, the various layers of reinforcement (e.g., skimmed tire cord oriented at +54 deg 44 minutes 1, and −54 deg 44 minutes 2 followed by an environment resistant cover layer 38, on a cylindrical mandrel 3 (FIG. 17). During or after building the aforementioned layers, extruded wedges 4a, 4b, 4c, 4d, and 4e of uncured high durometer rubber are inserted between adjacent edges of the layers of reinforcement. Retaining rings 39c are secured to terminating flanges 5 to control the precise shape of the enlarged wedge sectioned hose ends 8. See FIG. 17. The aformentioned assembly is then cured in a conventional manner by, for example, winding it with nylon ribbon 7, followed by autoclave curing. Exposed reinforcing cord ends may optionally be vented to atmosphere or vacuum during cure as depicted by vent means 6.

Referring again to FIG. 6, the wedge inserts 4a, 4b, 4c, 4d, and 4e, for example, may be configured to be identical in cross section to facilitate manufacture using a minimal number of prefabricated (i.e., extruded) shapes. Preferably the wedges are triangular in cross-section.

Figure 2:
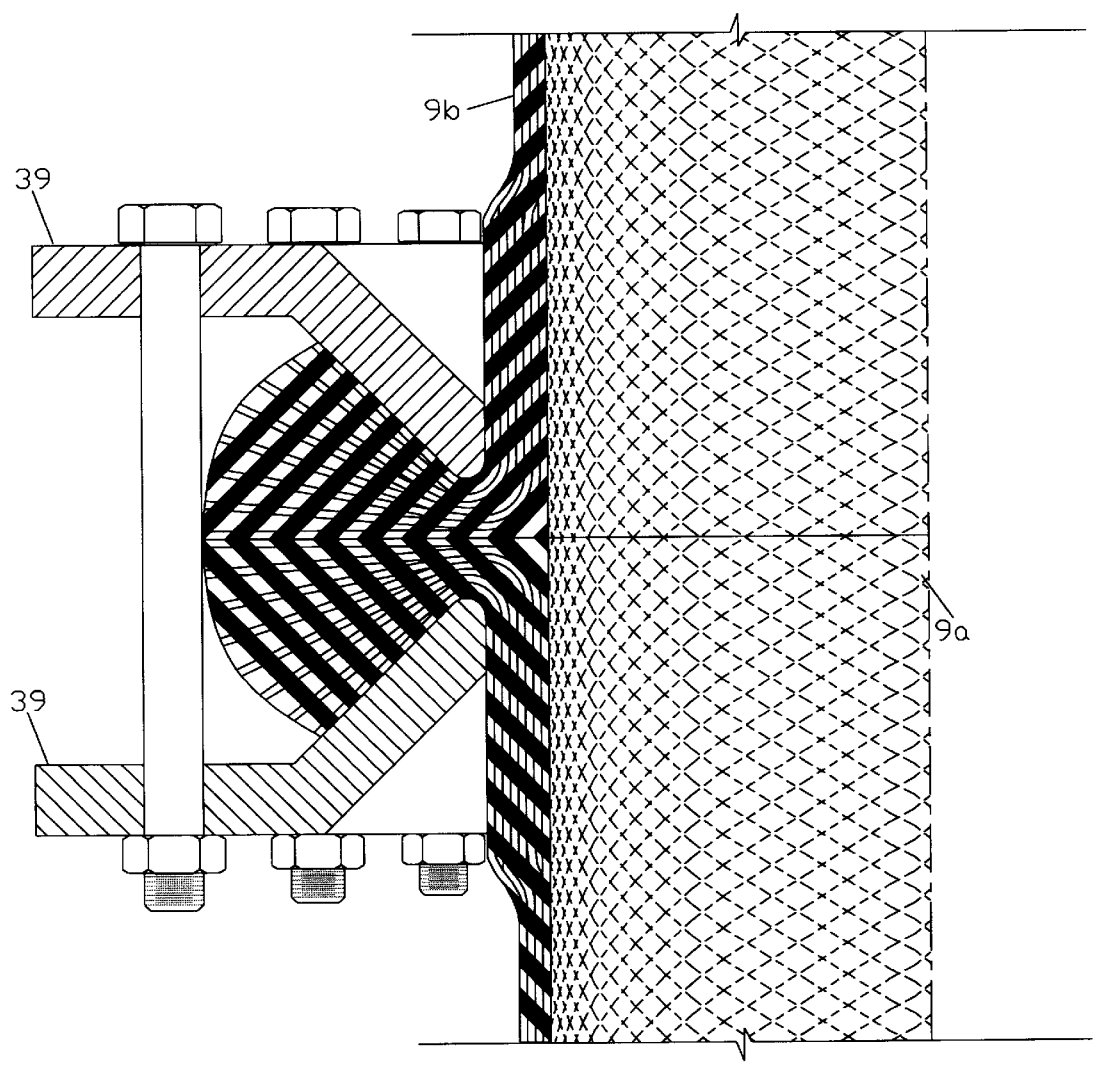
FIG. 2 is a cross-sectional view of another embodiment of a hose connection constructed in accordance with the present invention.

Referring to FIG. 2, the reinforcement near the hose end may incorporate a greater number of plies near the hose end 9a than in the body of the hose 9b in order to accommodate wear, stress concentrations, or bending or support loads associated with the clamp system.

Figure 3:
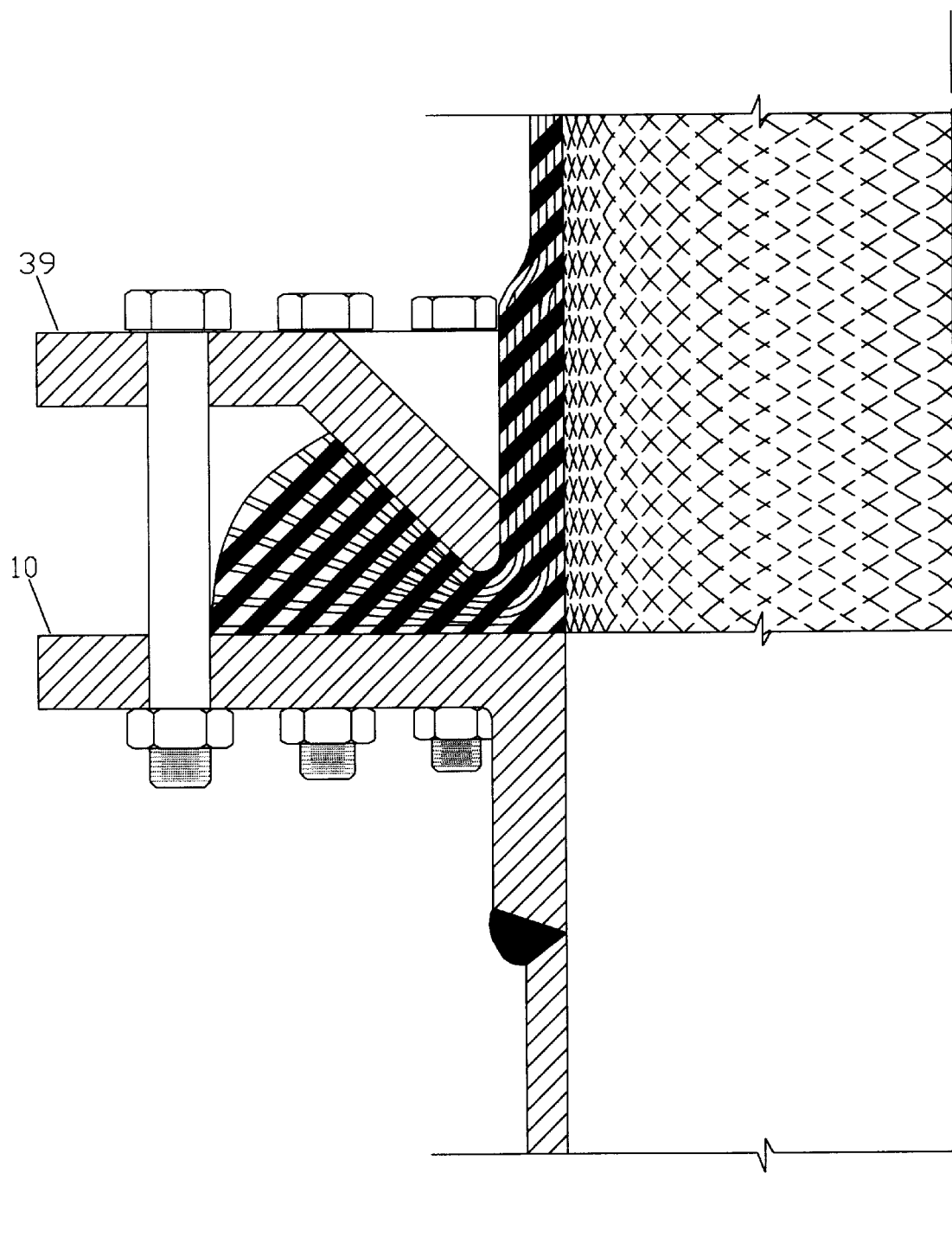
FIG. 3 is a cross-sectional view of the embodiment shown in FIG. 2, with a hose connected to a pipe flange.
Figure 4:
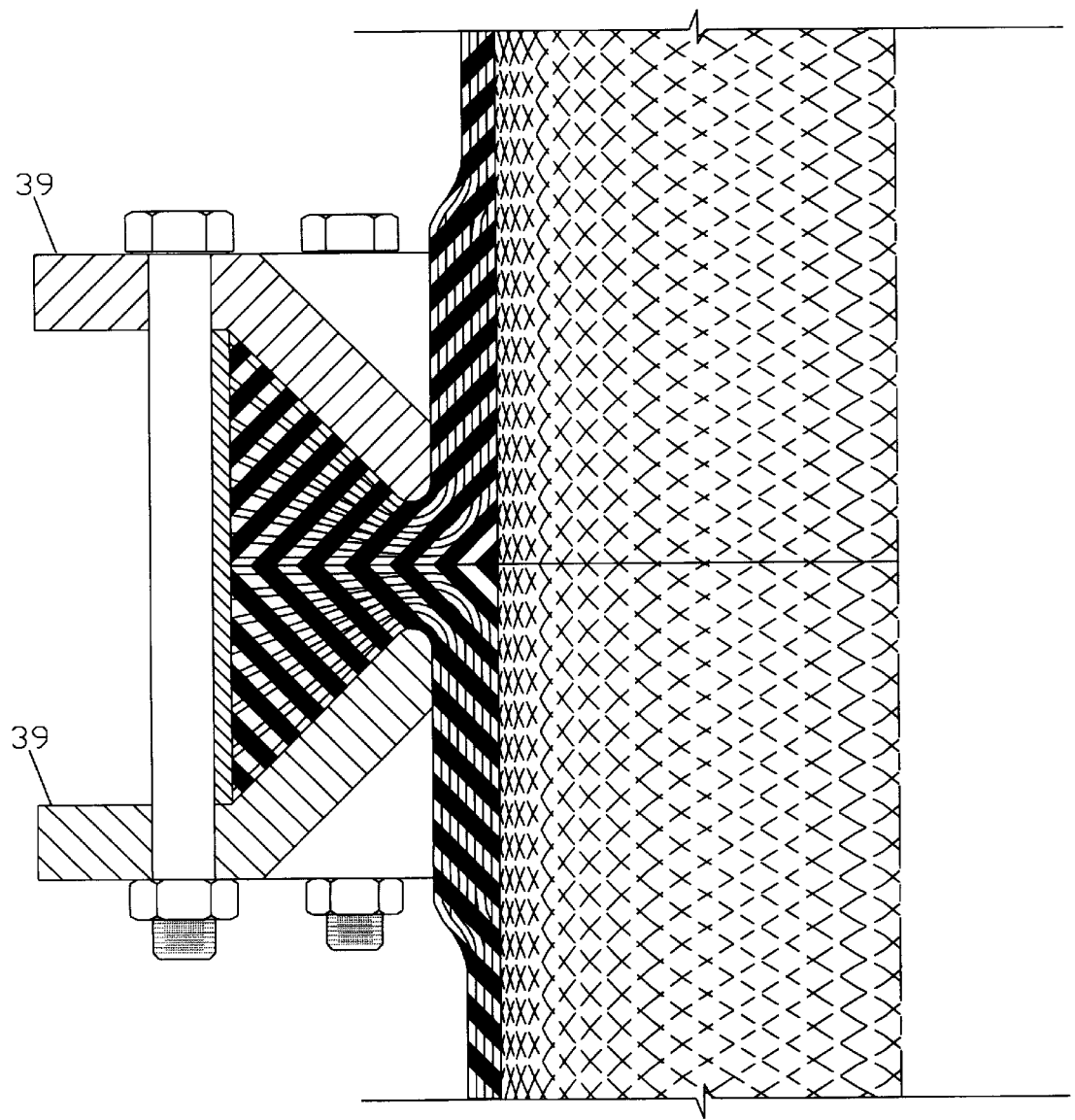
FIG. 4 is a cross-sectional view of another embodiment of a connection system in accordance with the present invention.
Figure 5:
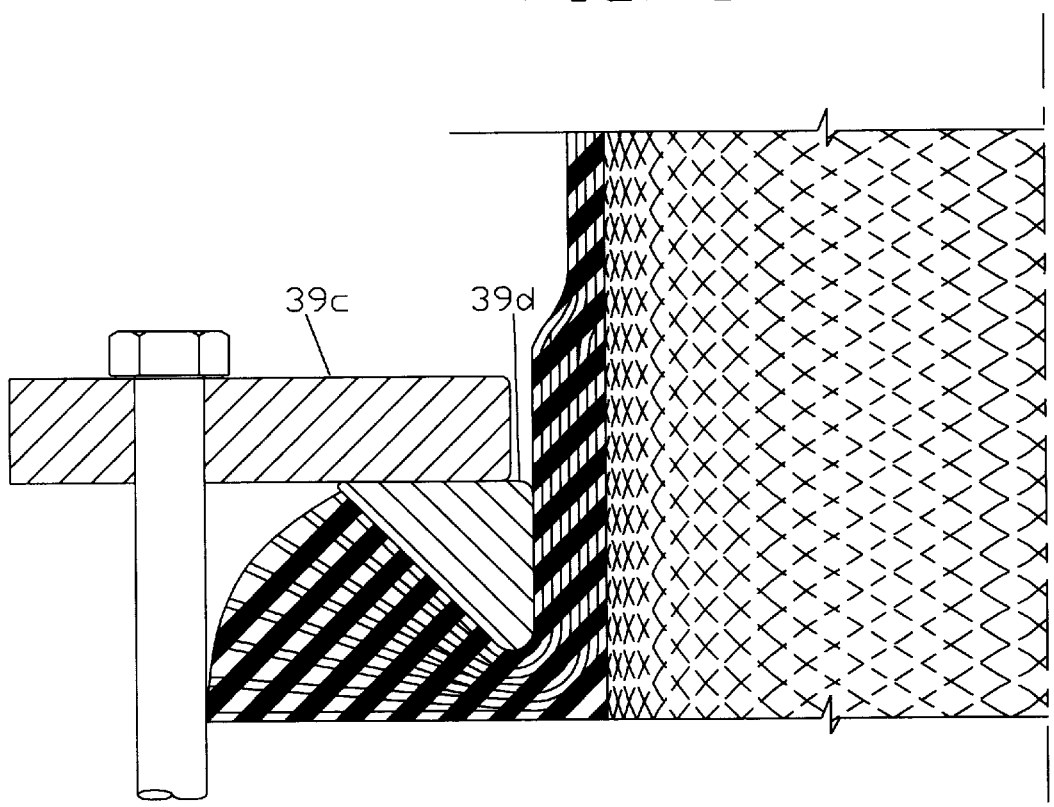
FIG. 5 is a cross-sectional view of another embodiment of connection system in accordance with the present invention, incorporating a two-part clamp arrangement.
Figure 7:
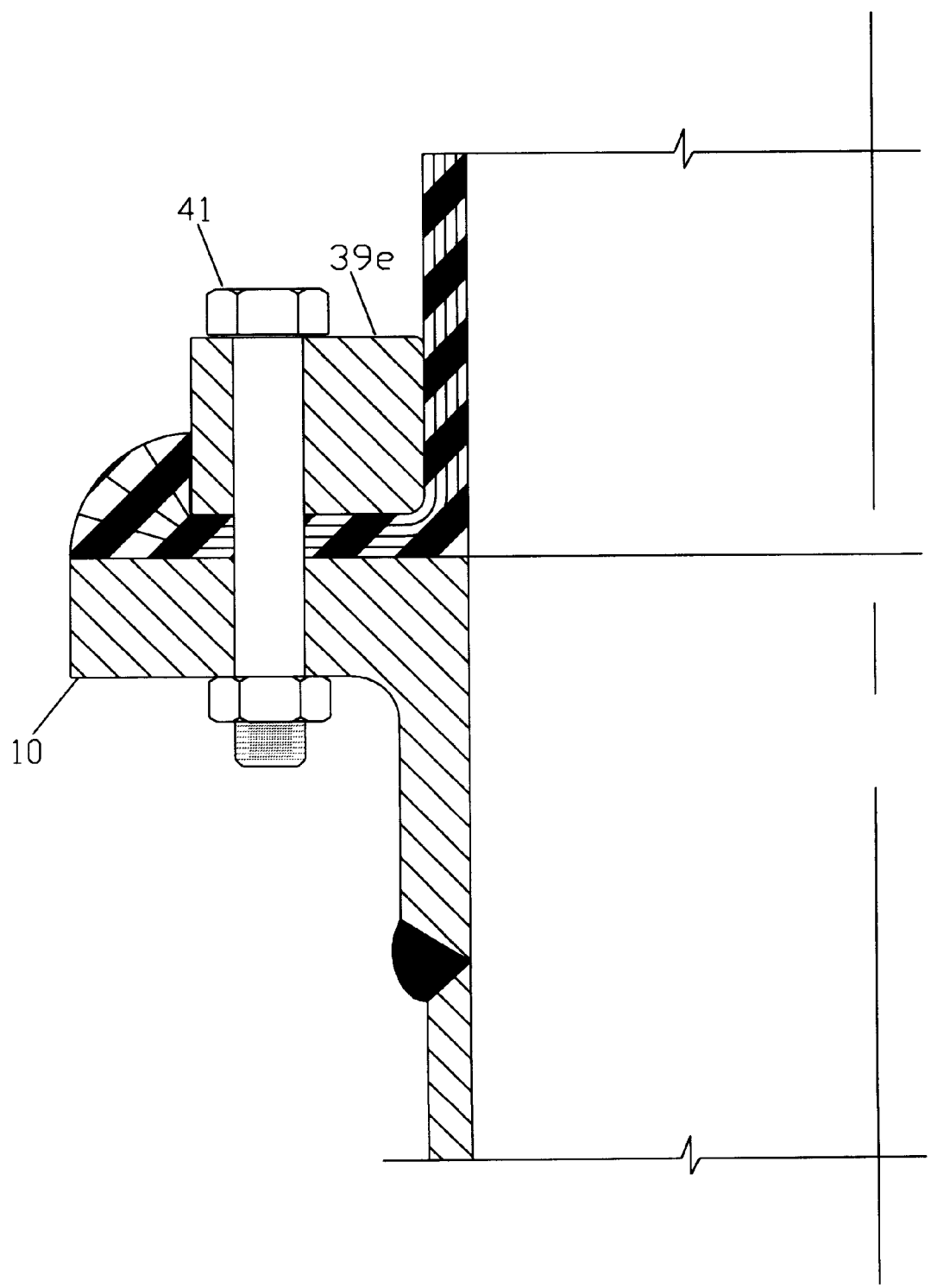
FIG. 7 is a cross-sectional view of another embodiment of the present invention.
Figure 8:
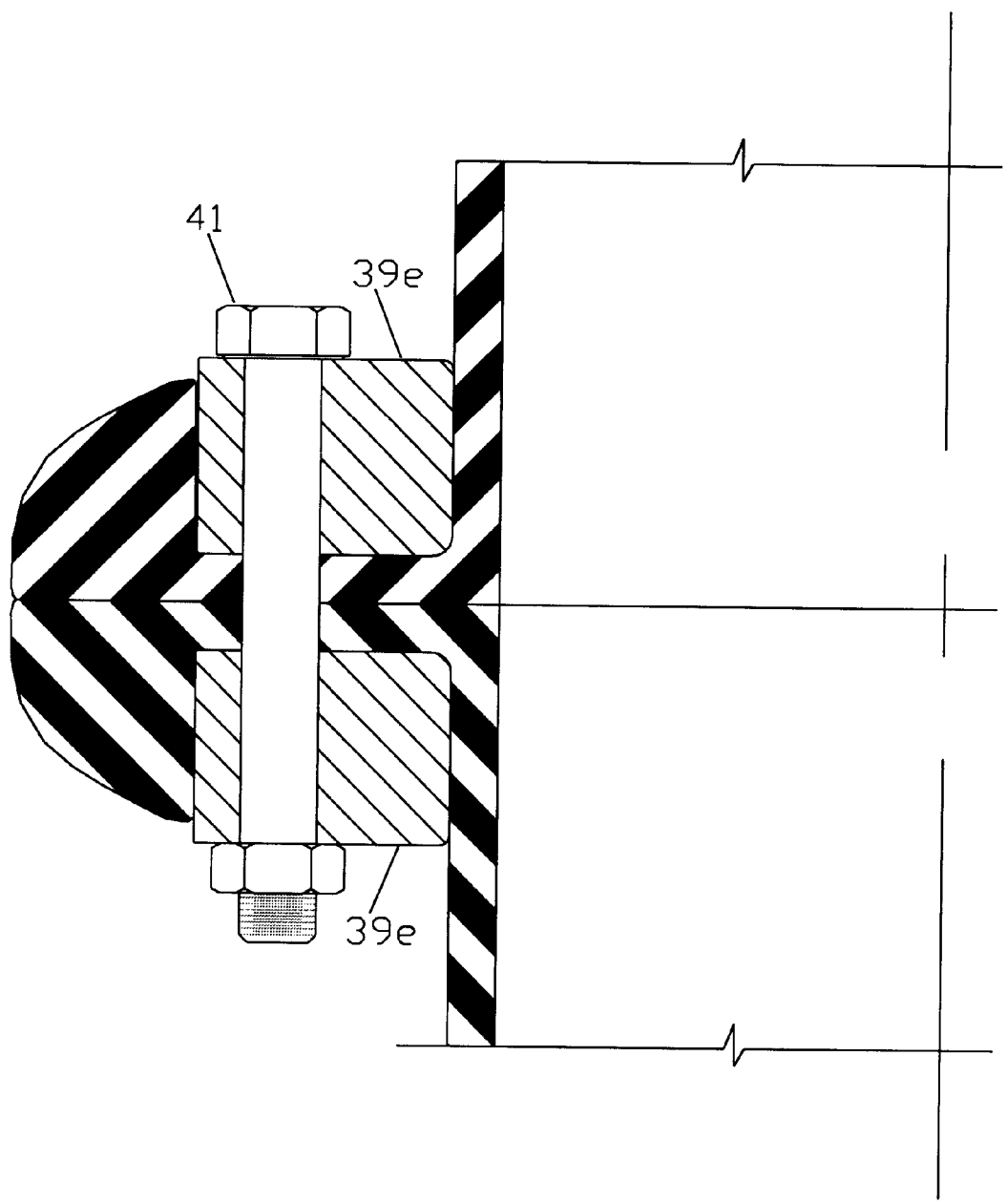
FIG. 8 is a cross-sectional view of another embodiment of the present invention.
Figure 9:
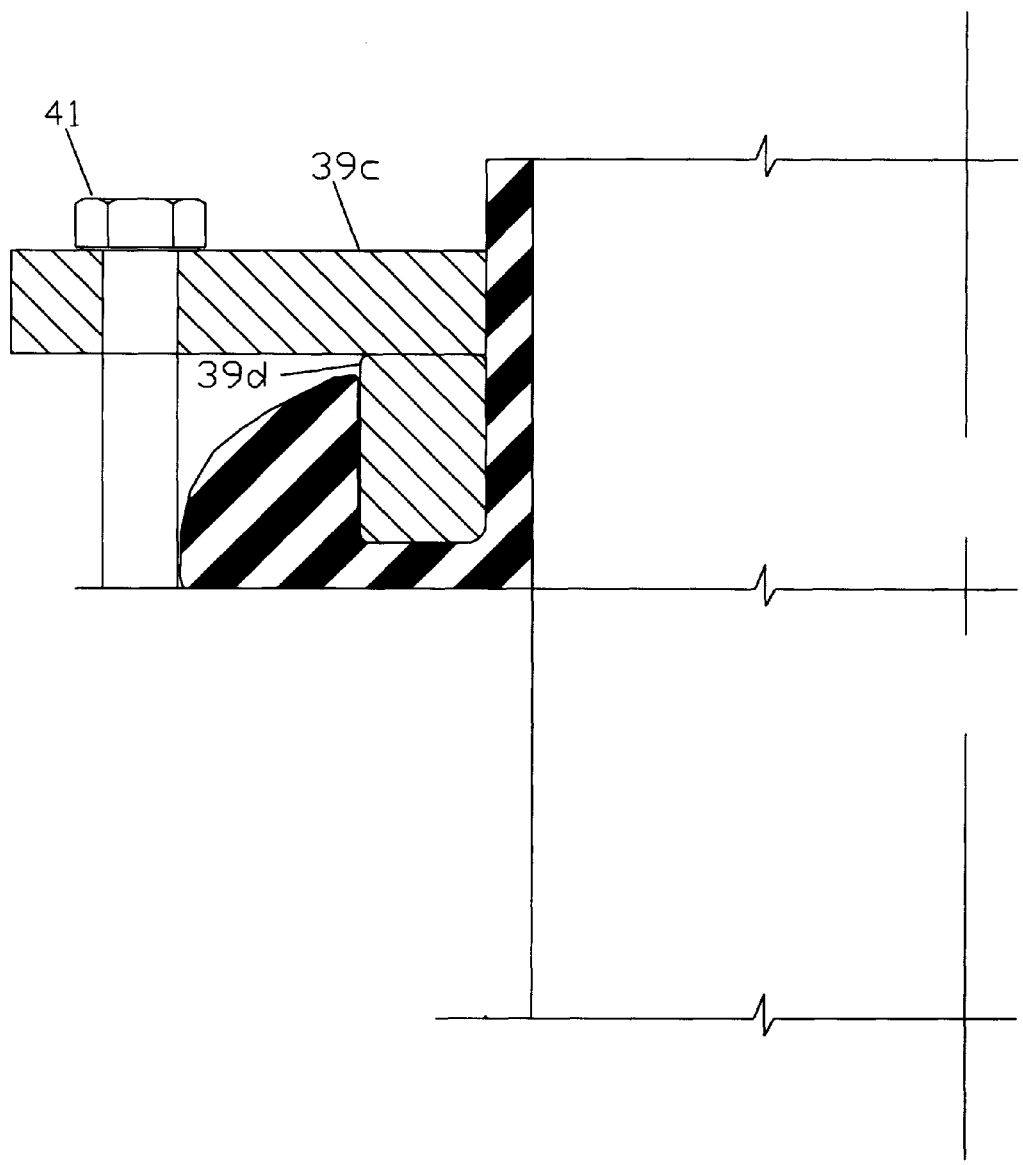
FIG. 9 is a cross-sectional view of another embodiment of the present invention.
Figure 10:
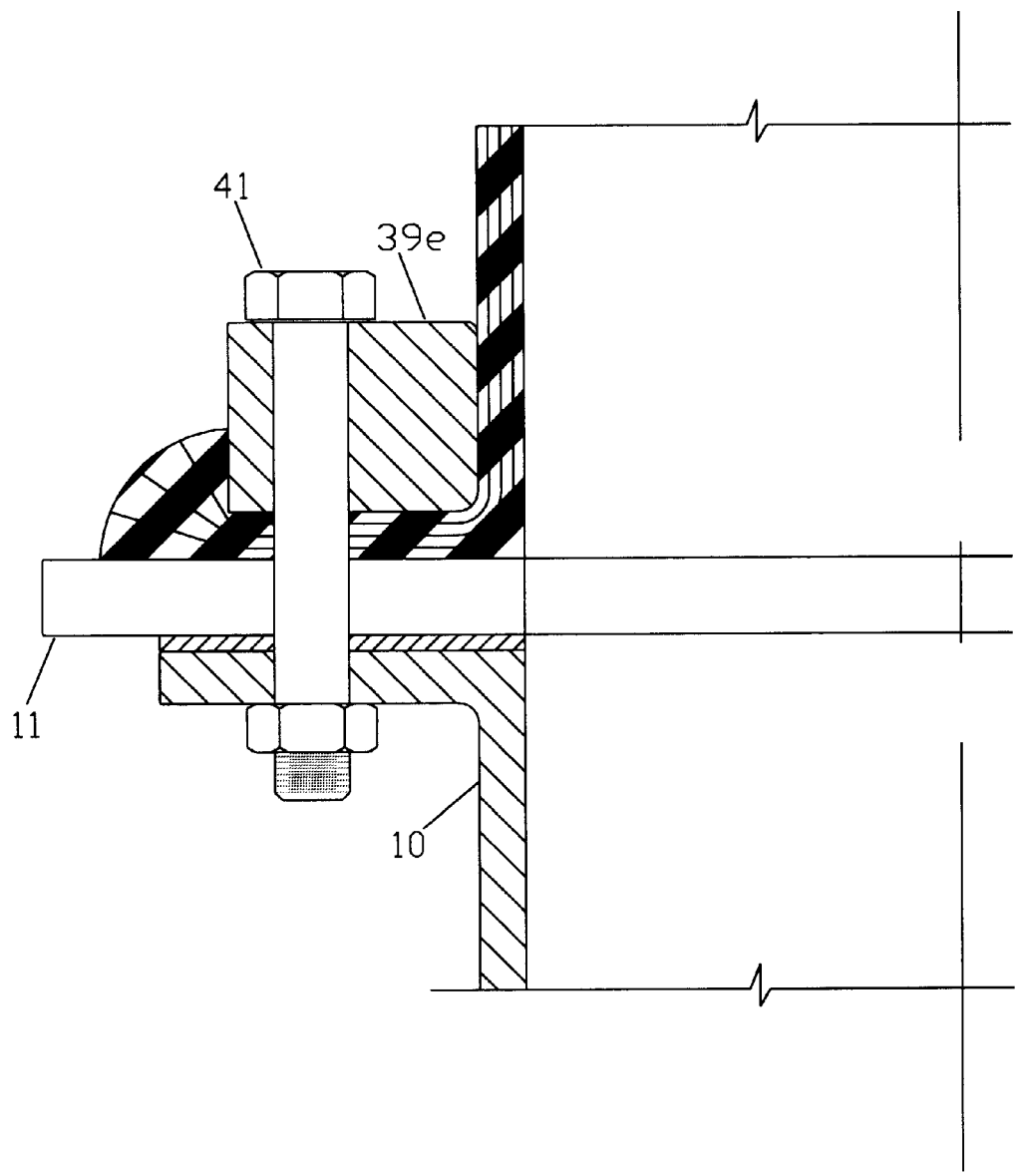
FIG. 10 is a cross-sectional view of another embodiment of the present invention.

Referring to FIG. 3, the hose termination of the present invention may be connected to a rigid flange or mounting surface 10 in lieu of being connected to a similar hose. Referring to FIG. 7, FIG. 8, FIG. 10, and FIG. 11, the elastomeric hose flange may be perforated to accommodate bolt circle diameters which are small in comparison to the desired wedge cross section and wedge outside diameter. FIG. 7 shows a hose-to-rigid flange 10 connection using a small bolt circle diameter to accommodate bolt 41. FIG. 8 shows a hose-to-hose connection using a small bolt circle diameter. FIG. 10 shows a hose-to-rigid flange connection which utilizes a supplementary flange 11 to support the hose wedge section.

Figure 11:
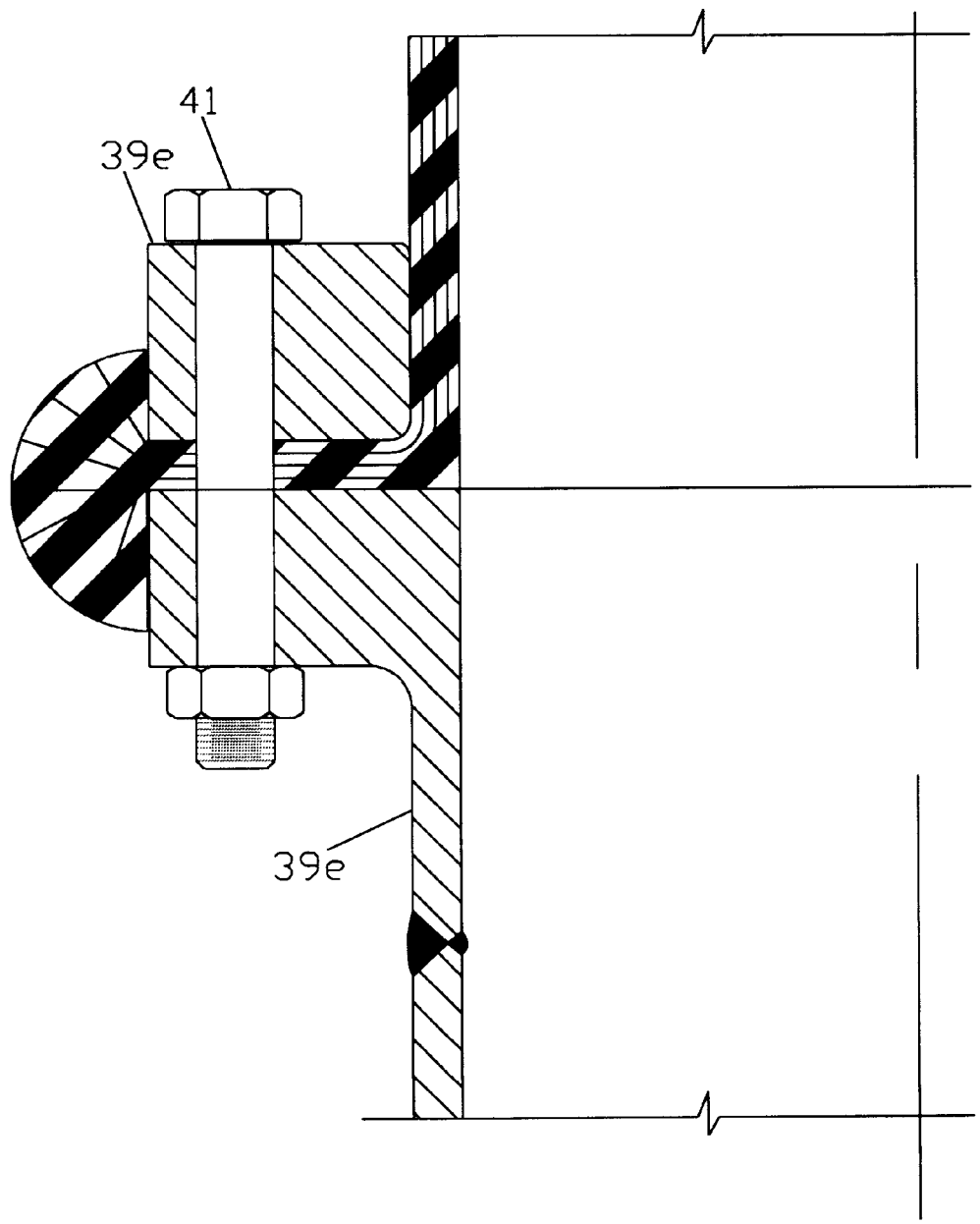
FIG. 11 is a cross-sectional view of another embodiment of the present invention.
Figure 12:
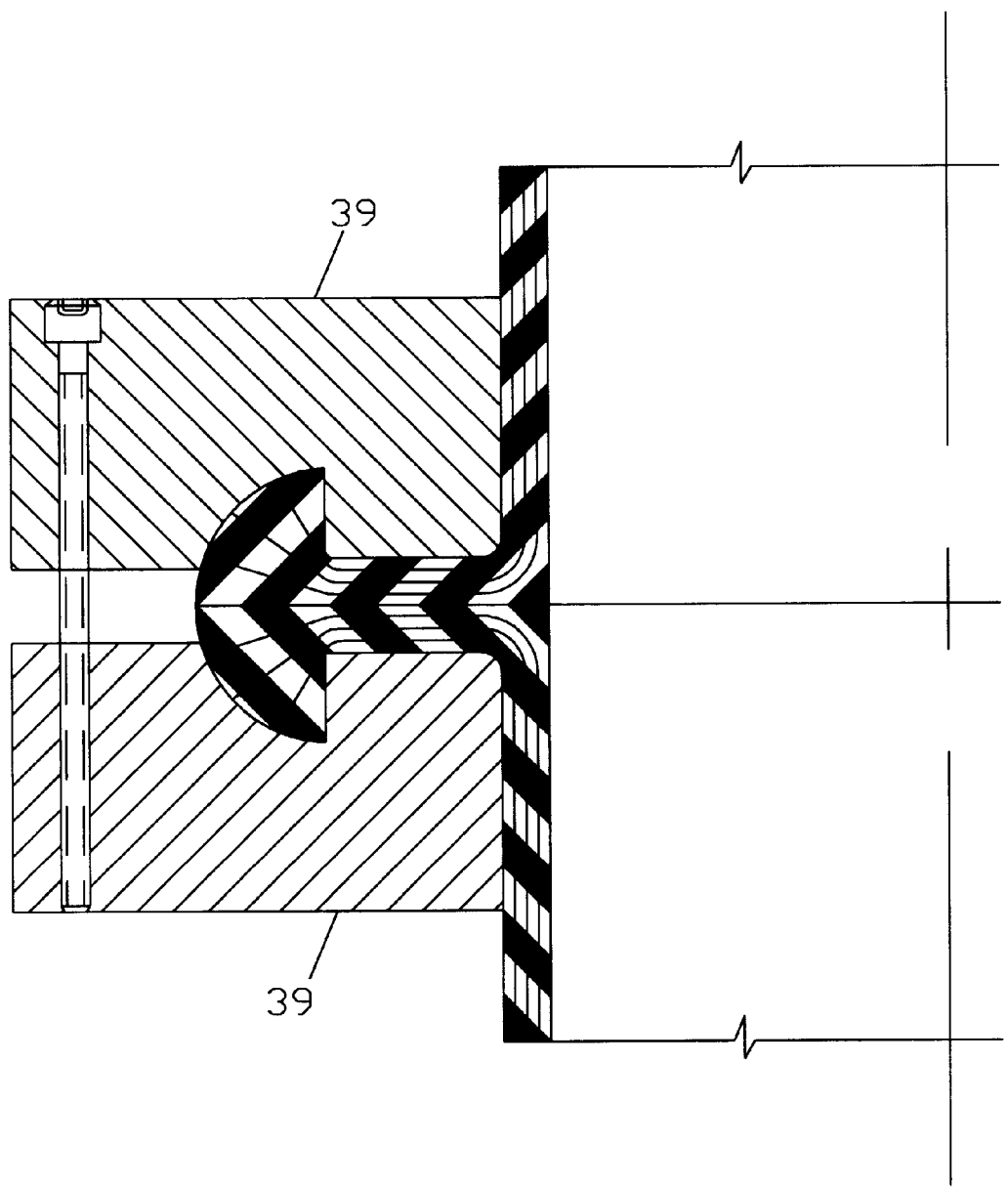
FIG. 12 is a cross-sectional view of another embodiment of the present invention.

FIG. 11 shows a hose-to-rigid flange connection wherein the hose wedge angle is enlarged in order to maximize the strength of the hose termination. FIG. 12 shows a hose termination with greater wedge angle and greater strength than the embodiment shown in FIG. 11.

Figure 13:
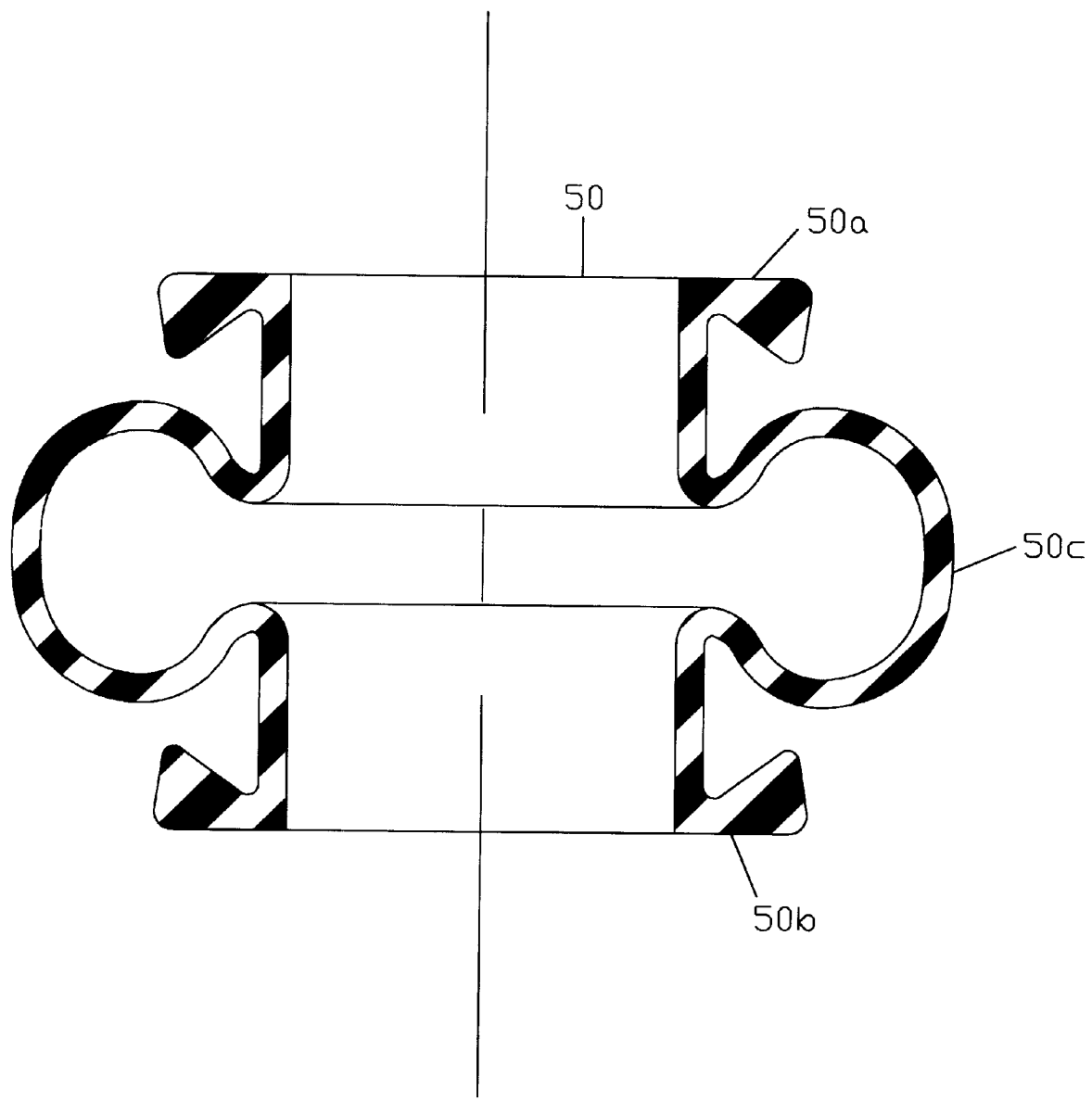
FIG. 13 is a cross-sectional view of one embodiment of the present invention wherein the hose is configured as an expansion joint.
Figure 14:
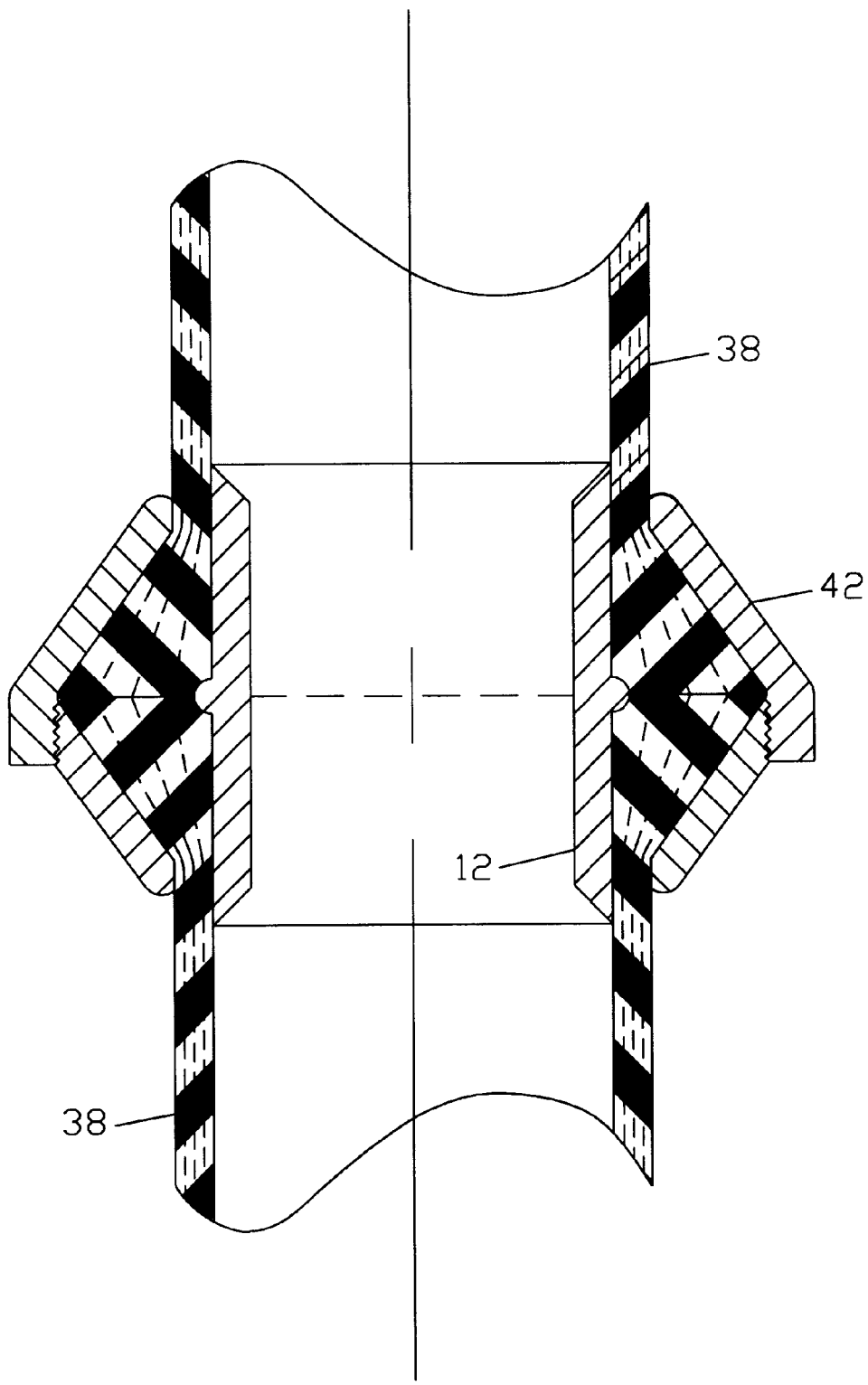
FIG. 14 is a cross-sectional view of another embodiment of the present invention.
Figure 15:
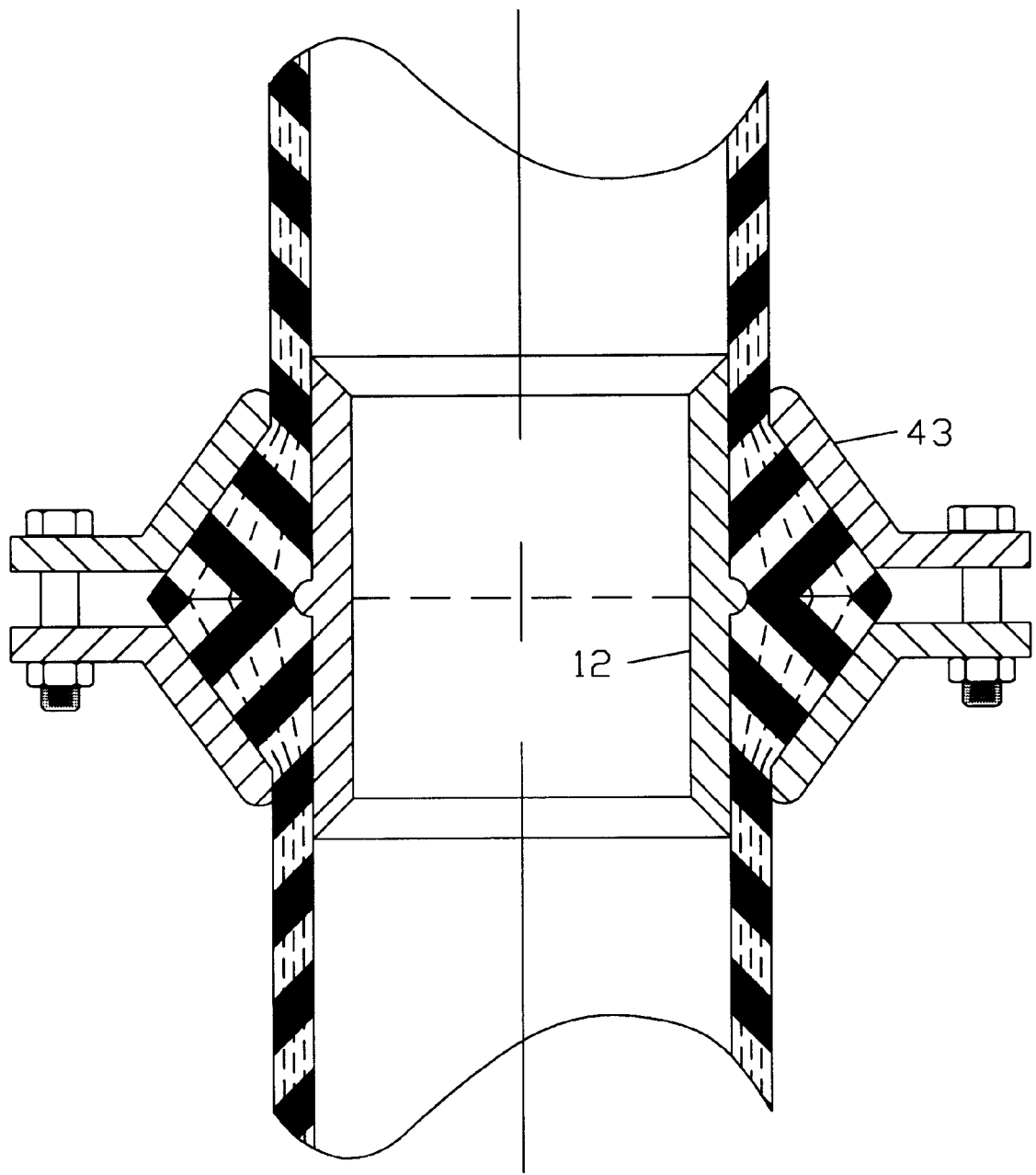
FIG. 15 is a cross-sectional view of another embodiment of the present invention.

FIG. 13 shows a hose 50 with ends 50a and 50b in accordance with the present invention, including an expanded section 50c, which hose is configured as a pipe expansion joint. FIG. 14 and FIG. 15 depict embodiments of the present invention which utilize internal spools 12 against which external clamps 42 and 43, respectively, are tightened in order to achieve a connection and seal for the connection of hoses 38.

Figure 1:
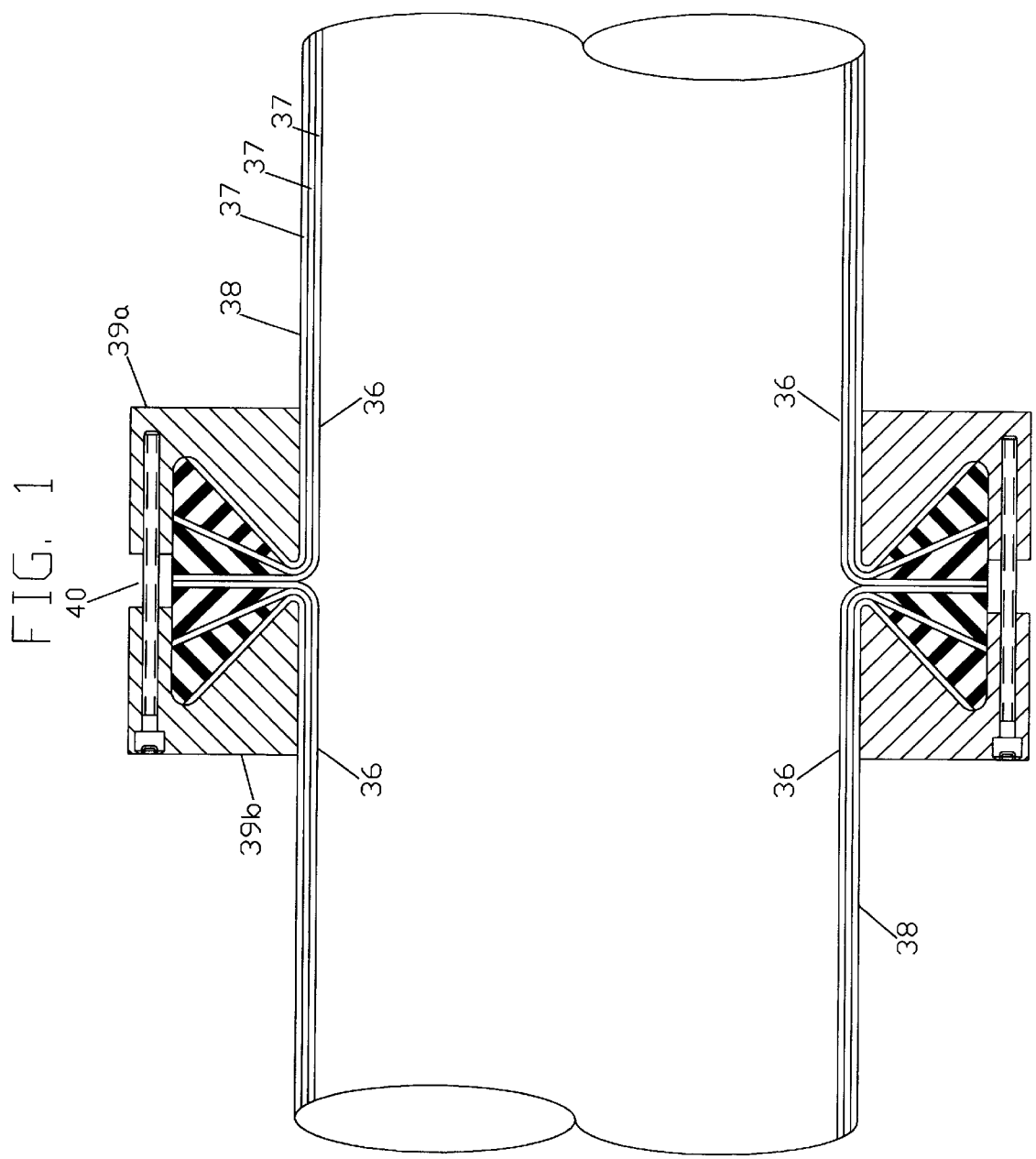
FIG. 1 is a cross-sectional view of one embodiment of a hose connection constructed in accordance with the present invention.

Another embodiment of the hose connection assembly illustrated in FIG. 1 is comprised of a liner 36, various layers of reinforcement 37, a cover 38, clamping rings 39a and 39b, and bolts 40. The recesses in the clamping rings are shaped to match the clamped wedge-shaped flanges of the two hoses 38. In this manner a tight seal is created with no metal parts exposed to the fluid carried by the hoses, and the strength of the connection closely approximates the strength of the hose reinforcement itself. Additionally, no elastomer-to-metal chemical bonds are required to secure the hose ends together.

Figure 16:
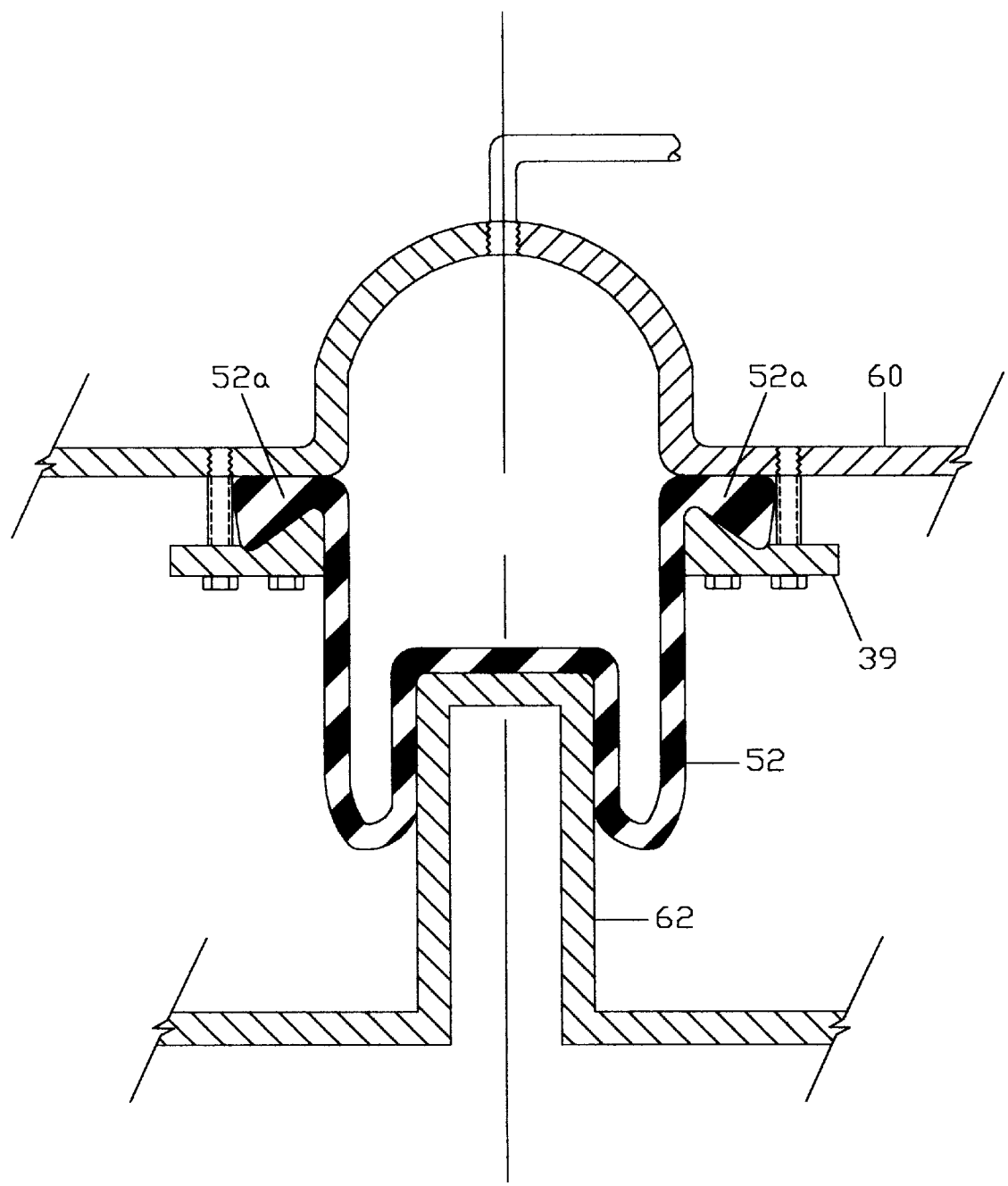
FIG. 16 is a cross-sectional of the present invention with the hose configured as a vehicle air spring.
Figure 18:
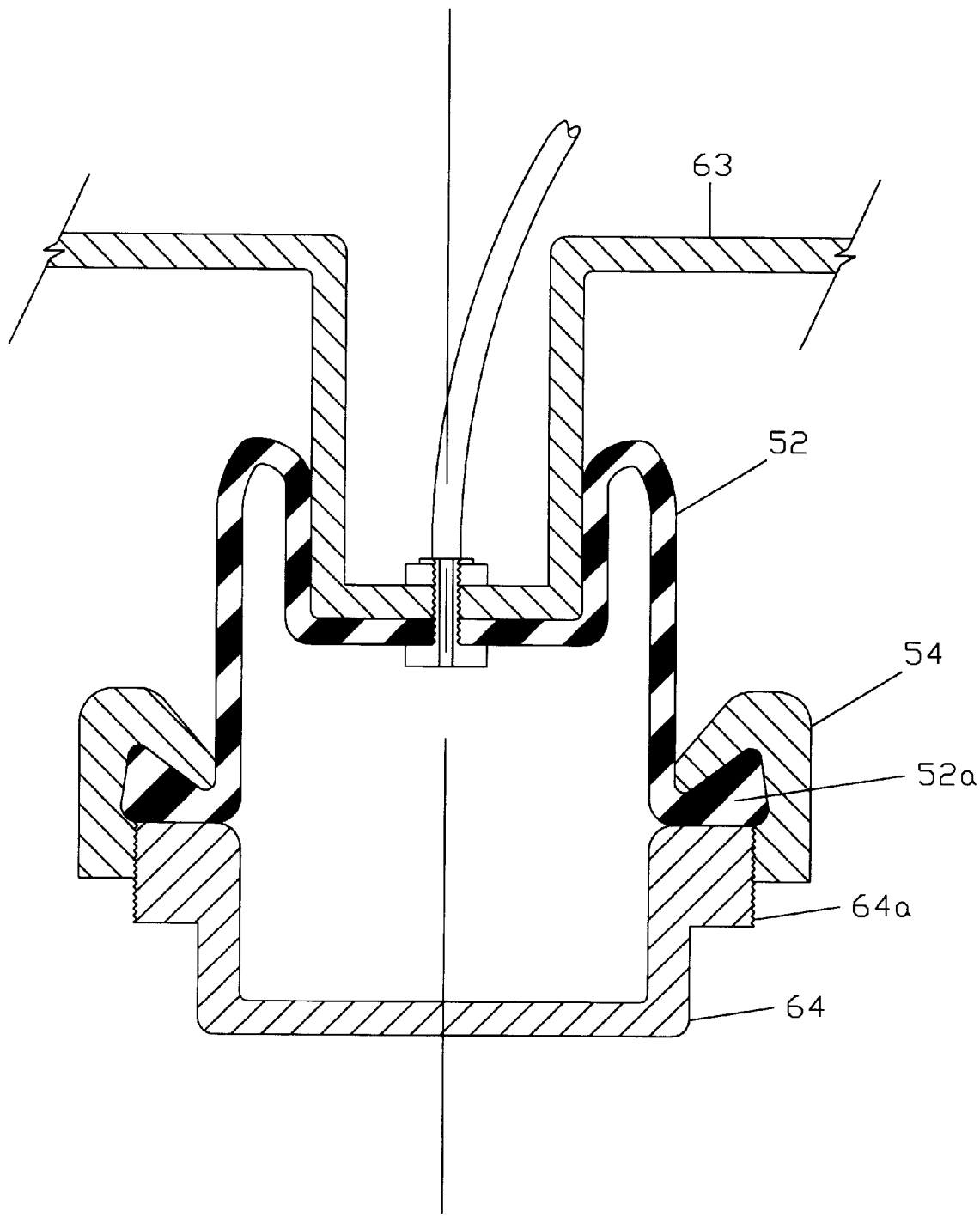
FIG. 18 is a cross-sectional view illustrating use of the invention as an air spring.

The connection system of the invention is useful in a variety of situations other than for hose connections. For example, the connection system is useful in expansion joints and in actuators (e.g., air springs). This is illustrated, for example, in FIGS. 16 and 18. In FIG. 16 the inflatable member 52 includes a terminal end portion 52a with wedges therein enabling it to be clamped to frame 60. Member 62 may be secured, for example, to the axle of a vehicle. The inflatable member 52 effectively cushions the frame 60 from vertical movement of the axle. In FIG. 18 the inflatable member 52 is positioned between frame member 63 and member 64 which is attached to the axle of a vehicle. A clamp 54 is threaded onto the flange 64a to secure the terminal end 52a to member 64. The connection system can also be used in door seals and in aerospace applications. Depending upon the desired application, the reinforced layers can be elastomeric or rigid.

Other variants are possible without departing from the scope of this invention.

What is claimed is:

1. A tubular structure comprising a plurality of layers of reinforced material and including a terminal end portion, wherein said end portion further includes at least one elastomeric wedge member between separate adjacent layers of said reinforced material; wherein said at least one wedge member includes opposite side surfaces bonded to said adjacent layers.

2. A tubular structure in accordance with claim 1, wherein said at least one wedge member has a triangular cross-section.

3. A tubular structure in accordance with claim 1, wherein said layers of reinforced material comprise elastomeric sheets.

4. A tubular structure in accordance with claim 1, wherein said at least one wedge member comprises a plurality of wedges each of which has a triangular cross-section.

5. A tubular structure in accordance with claim 1, wherein said tubular structure comprises a hose.

6. A tubular structure in accordance with claim 1, wherein said tubular structure comprises an expansion joint.

7. A tubular structure in accordance with claim 1, wherein said tubular structure comprises an air spring.

8. A combination comprising:
   (a) a first tubular structure comprising a plurality of layers of reinforced material and including a first terminal end portion, wherein said end portion further includes a first wedge member between separate adjacent layers of said reinforced material;
   (b) a second tubular structure comprising a plurality of layers of reinforced material and including a second terminal end portion, wherein said end portion further includes a second wedge member between separate adjacent layers of said reinforced material; and
   (c) clamp means surrounding said first and second terminal end portions for holding said end portions together in abutting relationship.

9. A combination comprising:
   (a) a tubular structure comprising a plurality of layers of reinforced material and including a terminal end portion, wherein said end portion further includes at least one elastomeric wedge member between separate adjacent layers of said reinforced material; wherein said at least one wedge member includes opposite side surfaces bonded to said adjacent layers;
   (b) a mounting surface; and
   (c) clamp means surrounding said terminal end portion and fastened to said mounting surface for connecting said end portion to said mounting surface in abutting relationship.

* * * * *